No. 670,514. Patented Mar. 26, 1901.
J. A. LEE.
PLOW.
(Application filed Nov. 8, 1900.)
(No Model.)
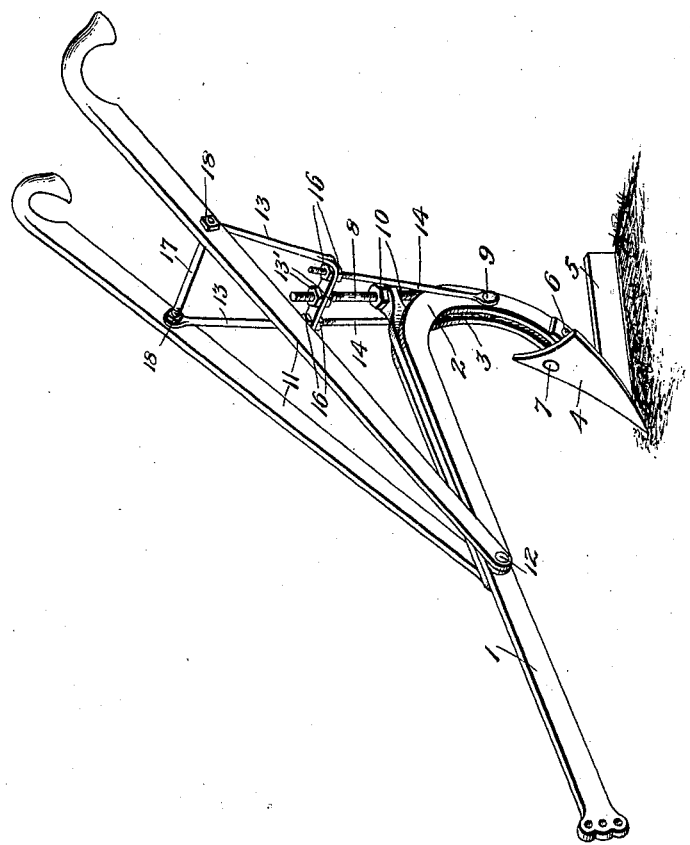
Witnesses
Inventor
J. A. Lee
by H. B. Willson & Co.
Attorneys

UNITED STATES PATENT OFFICE.

JONATHAN A. LEE, OF QUITMAN, GEORGIA.

PLOW.

SPECIFICATION forming part of Letters Patent No. 670,514, dated March 26, 1901.

Application filed November 8, 1900. Serial No. 35,842. (No model.)

*To all whom it may concern:*

Be it known that I, JONATHAN A. LEE, a citizen of the United States, residing at Quitman, in the county of Brooks and State of Georgia, have invented certain new and useful Improvements in Plows; and I do declare the following to be a full, clear, and exact description of the invention, such as will enable others skilled in the art to which it appertains to make and use the same.

The invention has relation to plows.

The object of the invention is to provide a plow-stock of such construction as to permit of the use of various forms of shovels and moldboards, whereby one plow may be used for manifold purposes and dispense with the employment of several different kinds of plows necessary in tilling the soil.

With this object in view the invention consists in certain features of construction and combination of parts, which will be hereinafter fully described and claimed.

In the drawing I have illustrated my invention in perspective, showing an ordinary cultivator-shovel attached to the standard, although it is to be understood that any form of shovel or moldboard may be employed to suit the occasion.

1 denotes the plow-beam, and 2 the standard, which is pivoted at its forward end to the beam and is curved rearwardly and downwardly. This standard consists of two parallel arms spaced apart to straddle the beam and formed with a longitudinal opening 3. It is preferably formed of a single piece of metal bent to shape, as shown.

4 denotes the cultivator-shovel, and 5 a removable landside, which latter may be used when a moldboard is employed, but which is unnecessary when simply a cultivator-shovel is used. The landside is connected to the lower curved end of the standard by bolts 6 and the shovel by a bolt 7.

8 denotes a rod, the lower end of which is provided with an eye that fits between the parallel sides of the standard and is pivoted thereto by a bolt 9. This rod projects upward through an eye formed in the rear end of the beam and is screw-threaded. 10 denotes adjusting-nuts secured upon the lower screw-threaded portion of said rod and by means of which the proper adjustment with the beam may be given.

11 denotes the handles, pivoted to the beam by a bolt 12, and 13 denotes an inverted U-shaped brace, through the bight or base of which projects a screw-threaded rod, which is secured in place by adjusting-nuts 13.

In order to secure a firm engagement of the brace with the standard and prevent a twisting movement of one with respect to the other, I provide rods 14, the lower ends of which are fastened to the standard by bolts 15, and the upper ends of which are screw-threaded and project through apertures in the bight or base of the brace and are secured thereto by nuts 16.

17 denotes a cross-bar connecting the rear end of the plow-handles. This bar projects through eyes formed in the upper ends of the U-shaped brace and is secured to the brace and the handle by nuts 18.

From the foregoing description, taken in connection with the accompanying drawing, the construction, operation, and advantages of the plow just described will be readily understood and appreciated without requiring an extended explanation. By its employment the numerous agricultural machines employed for tilling the soil are dispensed with, as it is the aim of my invention to use the plow for the purpose for which heretofore several machines were required.

Having thus described the invention, what is claimed, and desired to be secured by Letters Patent, is—

A plow comprising a plow-beam having an eye at its rear end, a standard having rearwardly and downwardly curved ends, said standard consisting of parallel integral sides that embrace the beam and is formed with a longitudinal slot, plow-handles, bolts connecting the plow-handles and standard to the beam, a screw-threaded rod provided with an eye located between the parallel sides of the standard, brace-rods, a bolt extending through said brace-rods, parallel sides of the standard and the eye of the screw-threaded rod, a crosspiece connecting the plow-handles, an inverted-U-shaped brace having its lower end provided with a series of holes through which project the screw-threaded rod and the brace-rods, adjusting-nuts upon the ends of said screw-threaded rod and brace-rods, a cultivator-shovel, and a bolt extending through the cultivator-shovel and the longitudinal slot at the lower end of the standard, substantially as and for the purpose set forth.

In testimony whereof I have hereunto set my hand in presence of two subscribing witnesses.

JONATHAN A. LEE.

Witnesses:
S. S. MEADOWS,
H. B. LEE.